Patented July 24, 1923.

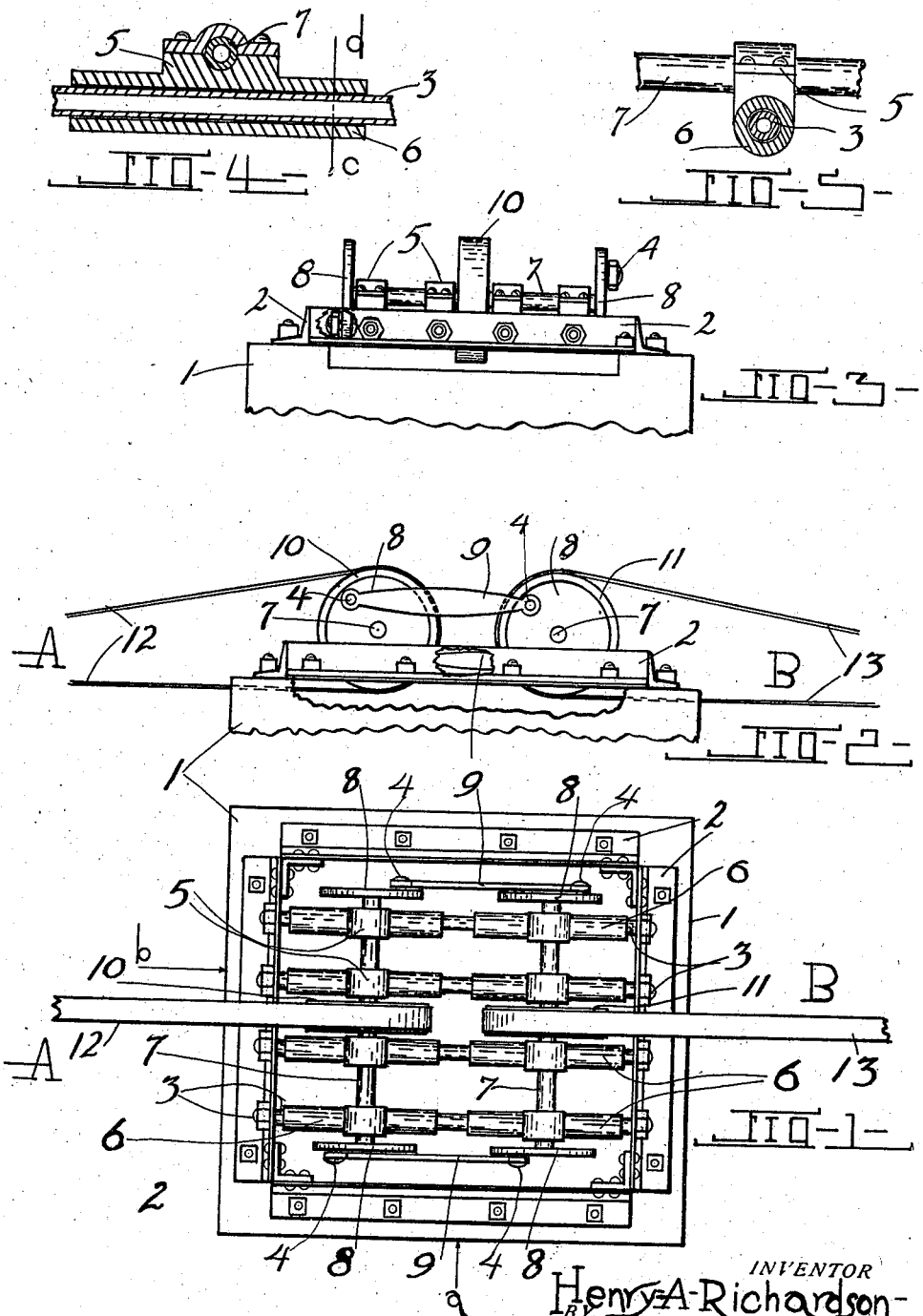

1,462,658

UNITED STATES PATENT OFFICE.

HENRY A. RICHARDSON, OF COLORADO SPRINGS, COLORADO.

POWER-TRANSMISSION APPLIANCE.

Application filed October 3, 1922. Serial No. 592,086.

*To all whom it may concern:*

Be it known that I, HENRY A. RICHARDSON, a citizen of the United States, residing at 406½ South Tejon Street, in the city of Colorado Springs, in the county of El Paso and State of Colorado, have invented a new and useful Power-Transmission Appliance, of which the following is a specification.

My invention relates to equalizing the pressure and power transmitted through a sliding cut-away transmission appliance of power from a motive engine to the load to be moved; and the object of my invention is to provide an appliance that will equalize the tension of the power belt and the load belt; second, to provide slidably mounted line shafts and load shafts on the same plane; third, to provide for reducing the friction in the transmission to the minimum; fourth, to provide for augmenting the efficiency of the power from the motor to increase the force usually applied to the operated mechanism provided to produce the desired effect.

I attain these objects by means of the mechanism described herein and illustrated in the accompanying drawing, in which—

Figure 1, is a plan view of my appliance complete; Fig. 2, is a side elevation of Fig. 1, in the direction of the arrow, *a;* Fig. 3, is an elevation in the direction of the arrow, *b;* Fig. 4, is a cross-sectional vertical elevation of one of the slidably mounted shaft-frames 6; Fig. 5, is a cross-sectional elevation of part of Fig. 4, on the line *c—d;* A indicates the power side, and B, indicates the load side of my appliance.

Similar numerals refer to similar parts throughout the several views.

Numeral 1, indicates an anchorage of concrete or other form of pier for the support of the frame 2: 3, indicates a plurality of tubular guide rods rigidly secured in a parallel position to each other to the said frame 2: 4, indicates the wrist pins connecting the crank wheels 8 with the connecting rods 9: 5, indicates the bearings rigidly secured to the tubular elements 6 and provided to support the journals of the shaftings 7: 10, indicates the power pulley and 11, indicates the load pulley on the separate shafts 7: 12, indicates the power belt from the source A of power and 13, indicates the load carrying belt.

This is purely an intermediate mechanical appliance, and the power mechanism and also the load mechanism is not shown or described herein. One of my reasons is that I have another invention in mind requiring this peculiar form of transmission for producing the desired effect.

It will be noticed that this form of transmission may be operated in either direction on the belts and I desire to have the motion of the transmission transversible and reversible as desired.

While the drawings show the connecting rods 9 provided to transmit force between the two shafts 7, I reserve the right to substitute belts or chains in their stead. I also reserve the right to use a plurality of belts where the single belts 12 and 13 are illustrated.

The equalizing strain on the belts 12 and 13 is maintained by the free slidable action of the tubular elements 6 on the tubular guide rods 3.

If it is desired to use this appliance for a common stationary intermediate jack, the tubular elements 6 may be rigidly blocked in the frame 2, to prevent their sliding on the guide rods 3. This however is an anticipated alteration or makeshift not shown in the drawings in operation. The blocking can be adjustably done.

I claim—

In an intermediate power transmission appliance, a rectangular frame, guide bars parallel to each other and rigidly secured in said frame, two separate sets of short tubes slidably mounted on said bars, bearings rigidly secured to top of the longitudinal centers of said tubes, two separate shaftings extending parallel to each other and transversely to said bars and said tubes and extending through said bearings, pulleys on each of said shafts intermediate their said bearings, belts operating said pulleys or operated thereby and transmitting force from the power unit to the load unit, and transmission means connecting said two shafts to operate them together the power from the one operating the other.

HENRY A. RICHARDSON.

Witnesses:
JOHN F. MULLANEY,
JOHN N. RICHARDS.